United States Patent
Hendriks et al.

(10) Patent No.: US 6,707,607 B2
(45) Date of Patent: Mar. 16, 2004

(54) OPTICAL SCANNING DEVICE

(75) Inventors: Bernardus Hendrikus Wilhelmus Hendriks, Eindhoven (NL); Jorrit Ernst De Vries, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 100 days.

(21) Appl. No.: 09/966,411

(22) Filed: Sep. 28, 2001

(65) Prior Publication Data

US 2002/0105733 A1 Aug. 8, 2002

(30) Foreign Application Priority Data

Oct. 3, 2000 (EP) .............................. 00203437
Nov. 14, 2000 (EP) .............................. 00203997

(51) Int. Cl.[7] .............................. G02B 27/44; G02B 5/18
(52) U.S. Cl. ........................................ 359/565; 359/574
(58) Field of Search ................................ 359/565–576, 359/708, 718

(56) References Cited

U.S. PATENT DOCUMENTS

| | | | | |
|---|---|---|---|---|
| 4,829,506 A | * | 5/1989 | Bressers et al. | 369/112.12 |
| 5,013,133 A | * | 5/1991 | Buralli et al. | 359/558 |
| 5,260,828 A | * | 11/1993 | Londono et al. | 359/565 |
| 5,745,289 A | * | 4/1998 | Hamblen | 359/565 |
| 6,462,874 B1 | * | 10/2002 | Soskind | 359/565 |

FOREIGN PATENT DOCUMENTS

| | | | | |
|---|---|---|---|---|
| EP | 468410 A1 | * | 1/1992 | G02B/3/08 |
| EP | 0865037 | | 9/1998 | G11B/7/135 |

OTHER PUBLICATIONS

Katayama et al., "Dual–Wavelength Optical Head with a WaveLength–Selective Filter for 0.6– and 1.2–mm–thick–substrate Optical Disks", Applied Optics, vol. 38, No. 17, Jun. 1999.

* cited by examiner

Primary Examiner—Scott J. Sugarman
Assistant Examiner—Darryl J. Collins
(74) Attorney, Agent, or Firm—Michael E. Belk

(57) ABSTRACT

An optical scanning device for scanning optical record carriers with radiation of a selected wavelength, the device including an objective lens, having an axial direction and a radial direction, and a phase structure which is non-periodic with respect to the radial direction, the non-periodic phase structure being arranged to compensate for comatic aberrations generated in the objective lens when an optical record carrier is read in a direction which is non-axial with respect to said objective lens, whereby an improved field of view is provided for said objective lens.

22 Claims, 3 Drawing Sheets

OPTICAL SCANNING DEVICE

The present invention relates to an optical scanning device comprising an optical objective lens, and to an optical element comprising an objective lens. More specifically, but not exclusively, the invention relates to an optical scanning device capable of writing and/or reading data to and/or from an optical record carrier such as a digital versatile disc (DVD), with a relatively large field tolerance using a single optical objective lens system. The field tolerance of a lens is limited by comatic aberrations introduced at off-axis parts of the field.

Objective lenses with relatively large field tolerances are desirable for use in scanning devices which allow multi-track readout, and/or radial tracking, in which the position of a beam spot varies in relation to the objective lens. For multi-track readout of DVDs, objective lenses with a numerical aperture (NA) at least of NA=0.6 and large field tolerances are required. Using standard glass replication techniques, only one surface of the lens may be made aspherical, significantly reducing the potential field tolerance of the lens. With known glass moulding or injection moulding techniques, two surfaces of a lens can be made aspheric. Although this in principle makes it possible to design a lens with a large field tolerance, allowing sufficient tolerance for tilt and decentring between the two aspheric surfaces of the lens again leads to a limited field tolerance. Consequently, manufacturing a lens with a large field, meeting the various constraints inherent in modern optical scanning devices, is difficult.

Using periodic (i.e. regularly repeating) phase structures, which provide diffractive effects, on the surface of a lens, it is possible to introduce comatic aberrations, whereby comatic aberrations generated in the lens may be compensated for. However, such diffractive structures are difficult to manufacture and are wasteful of radiation, causing a significant amount of scattering.

In accordance with one aspect of the present invention there is provided an optical scanning device for scanning optical record carriers with radiation of a selected wavelength, the device including an objective lens, having an axial direction and a radial direction, and a phase structure which is non-periodic with respect to the radial direction, the non-periodic phase structure being arranged to compensate for comatic aberrations generated in the objective lens when an optical record carrier is read in a direction which is non-axial with respect to said objective lens, whereby an improved field of view is provided for said objective lens.

The root mean square (rms) comatic wavefront error caused by the objective lens at a certain field angle with respect to the axial direction is preferably compensated for by at least 50% by said non-periodic phase structure. More preferably, the compensation is at least 70%. The field angle for an optical recording read and/or write device is preferably 1°. This is also the maximum required field angle for multi-track scanning of an optical record carrier. The resulting apparatus provides a significantly improved performance with a relatively large field tolerance. In the field of optical recording the residual amount of wavefront error at the maximum required field angle is after compensation preferably less than 40 m$\lambda$ and more preferably less than 20 m$\lambda$.

The non-periodic phase structure may include a plurality of annular zones, each of said zones comprising a step of a substantially constant height with respect to a rotationally symmetrical aspheric shape generally followed by said objective lens. Steps in the non-periodic phase structure preferably generate a relative phase difference of approximately a multiple of $2\pi$ for radiation of said selected wavelength when an optical record carrier is read in said axial direction. Thereby, the effect on the performance of the lens when operating axially is not significant.

The heights of said zones are selected substantially optimally in relation to the comatic aberration to be compensated for. Thereby, a relatively large degree of compensation can be provided.

The number of zones in the non-periodic structure is preferably limited, for manufacturing efficiency. The number of said zones is preferably less than 10, and may be in the region of only 5.

In accordance with a further aspect of the present invention there is provided an optical including an optical element having optical power and an axial direction and a radial direction, and a phase structure which is non-periodic with respect to the radial direction, the non-periodic phase structure being arranged to compensate for comatic aberrations generated by the optical element when an optical beam traverses the optical system in a direction which is non-axial with respect to said element, whereby an improved field of view is provided for said optical element. The optical element may be a lens or a mirror.

It is noted that it has previously been proposed to use a non-periodic phase structure to compensate for wavefront aberrations. Reference is made to "Dual-wavelength optical head with a wavelength-selective filter for 0.6- and 1.2-mm-thick-substrate optical disks", Katayama et al., Applied Optics, Vol. 38, No. 17, Jun. 10, 1999, JP-A-11002759 and EP-A-865037. However, in these proposed arrangements the non-periodic phase structures are used in order to compensate only for spherical aberrations due to differences in information layer depths in optical disks, when using two different wavelengths of radiation. Coma compensation is not considered or provided for.

Note that, in the case of the present invention, comatic aberration compensation may be achieved without altering the wavelength of the radiation applied.

Embodiments of the invention will now be described, by way of example only, with reference to the accompanying drawings, wherein:

FIG. 1 is a schematic illustration of components common to a device in accordance with the invention for scanning an optical record carrier 1. The record carrier 1 is in this embodiment an optical disc as will be described, by way of example, below.

Figure 1:
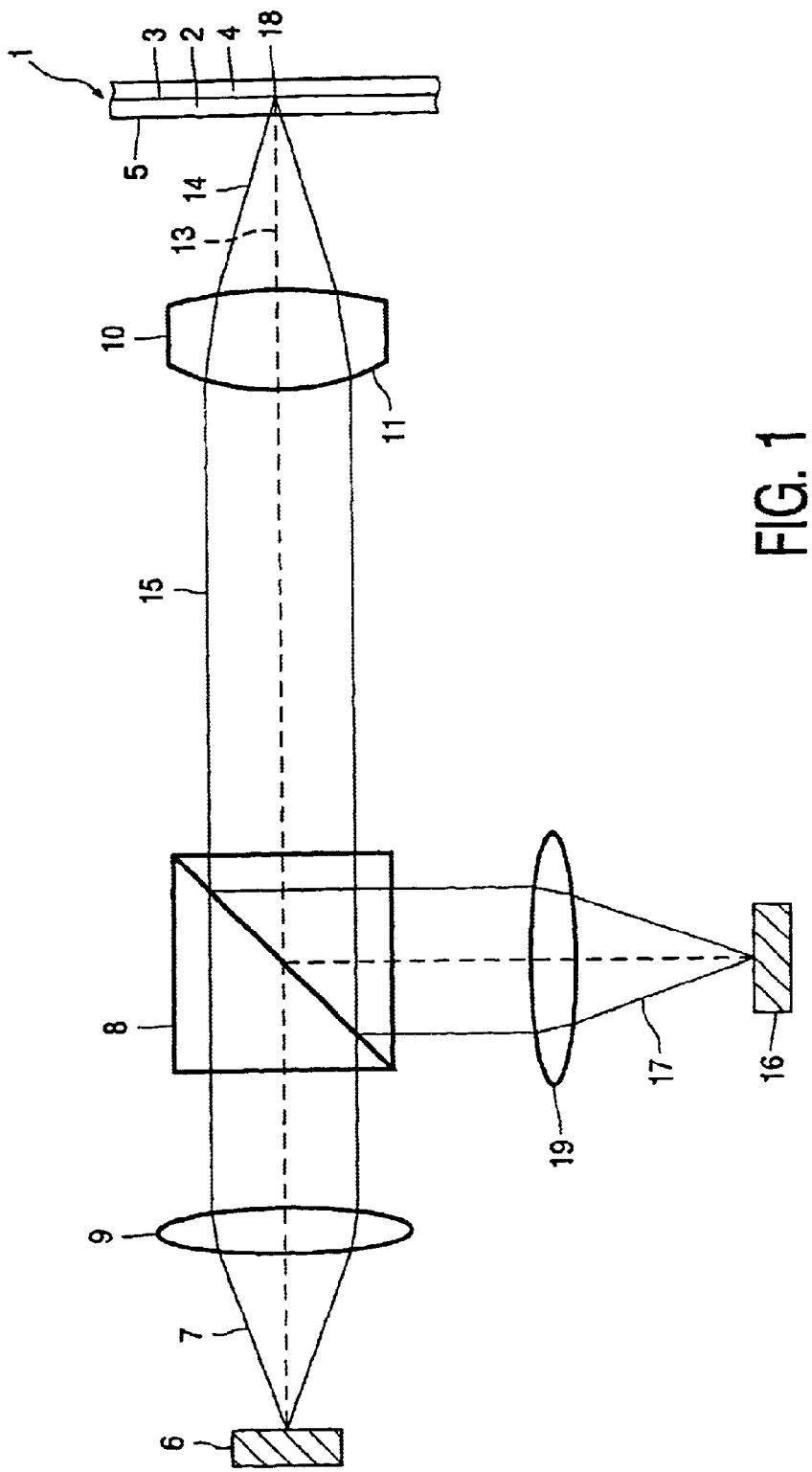
FIG. 1 is a schematic illustration of components of a scanning device for optical record carriers according to one embodiment of the present invention.

The optical disc 1 comprises a transparent layer 2, on one side of which at least one information layer 3 is arranged. The side of the information layer facing away from the transparent layer is protected from environmental influences by a protection layer 4. The side of the transparent layer facing the device is the disc entrance face 5. The transparent layer 2 acts as a substrate for the optical disc by providing mechanical support for the information layer or layers.

Alternatively, the transparent layer 2 may have the sole function of protecting the information layer 3, while the mechanical support is provided by a layer on the other side of the information layer, for instance by the protection layer 4 or by a further information layer and transparent layer connected to the uppermost information layer.

Information may be stored in the information layer 3, or information layers, of the optical disc in the form of optically detectable marks arranged in substantially parallel, concentric or spiral tracks, not indicated in FIG. 1. The marks may be in any optically readable form, e.g. in the form of pits, or areas with a reflection coefficient or a direct of magnetisation different from their surroundings, or a combination of these forms.

The scanning device includes a radiation source 6, comprising a semiconductor laser or two separate semiconductor lasers, emitting radiation of a selected wavelength in a diverging radiation beam 7 towards a lens system. The lens system includes a collimator lens 9 and an objective lens 10 arranged along optical axis 13. The collimator lens 3 transforms the diverging beam 7 emitted from the radiation source 6 into a substantially collimated beam 15. The objective lens 10 comprises a non-periodic phase structure, which is indicated in the drawing by the pattern 11 and will be described in more detail below. The objective lens 10 transforms the incident collimated radiation beam 15 into a converging beam 14, having a selected NA, which comes to a spot 18 on the information layer 3. A detection system 16, a second collimator lens 19 and a beam splitter 8 are provided in order to detect data signals, and focus error signals which are used to adjust mechanically the axial position of the objective lens 10.

The optical scanning device may be of the type capable to performing simultaneous multi-track scanning, which has the effect of improving data read-out and/or write speed. Such devices are known, and described for example in the U.S. Pat. No. 4,449,212, of which the description of the multi-trac reference.

By use of the scanning device, discs of DVD format may be scanned with laser radiation of a first wavelength $\lambda_1$ between say 620 and 700 nm, preferably $\lambda_1$=660 nm. A numerical aperture of about 0.6 is used for reading DVD and an NA above 0.6, preferably 0.65, is applied for writing DVD.

Figure 2:
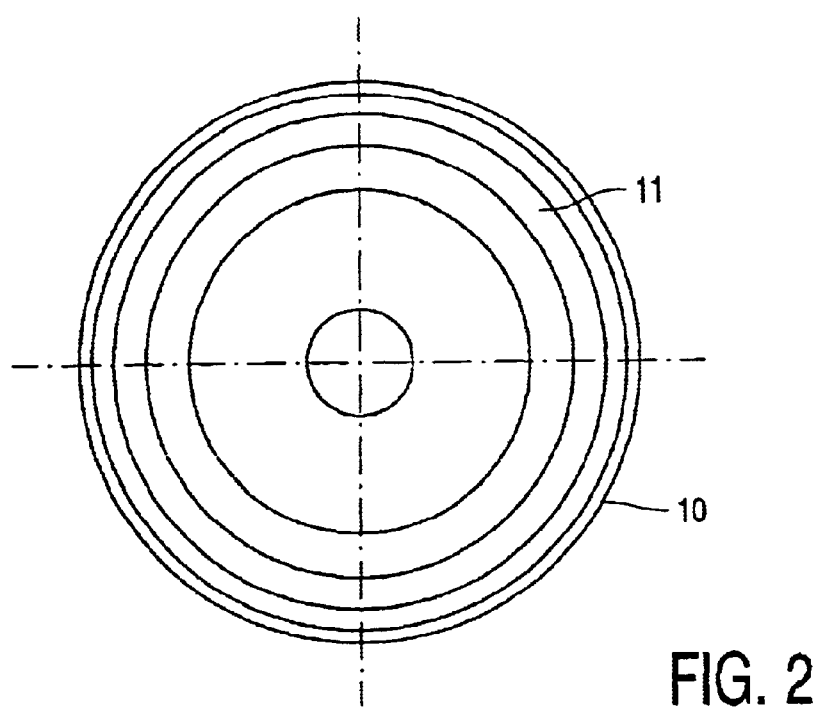
FIG. 2 is a schematic front view of the objective lens shown in FIG. 1, showing a non-periodic phase structure.

FIG. 2 is a schematic front view of the objective lens 10 illustrating the non-periodic phase structure. The non-periodic phase structure 11 is arranged on the side of the objective lens 10 facing the radiation source. However, it may alternatively be arranged on the other surface of lens 10. It can be seen that a plurality of phase structure elements are provided in the form of annular regions. Each annular region defines a so-called zone of the non-periodic phase structure. In order to enable acceptable operation of the lens over a relatively wide field of view, the non-periodic phase structure generates comatic aberrations at non-axial angles of incidence for the lens, to compensation for the comatic aberrations generated in the lens itself.

The general principle behind the comatic compensatory effect provided in the present invention will next be explained in some detail with reference to FIGS. 3 and 4.

Figure 3:
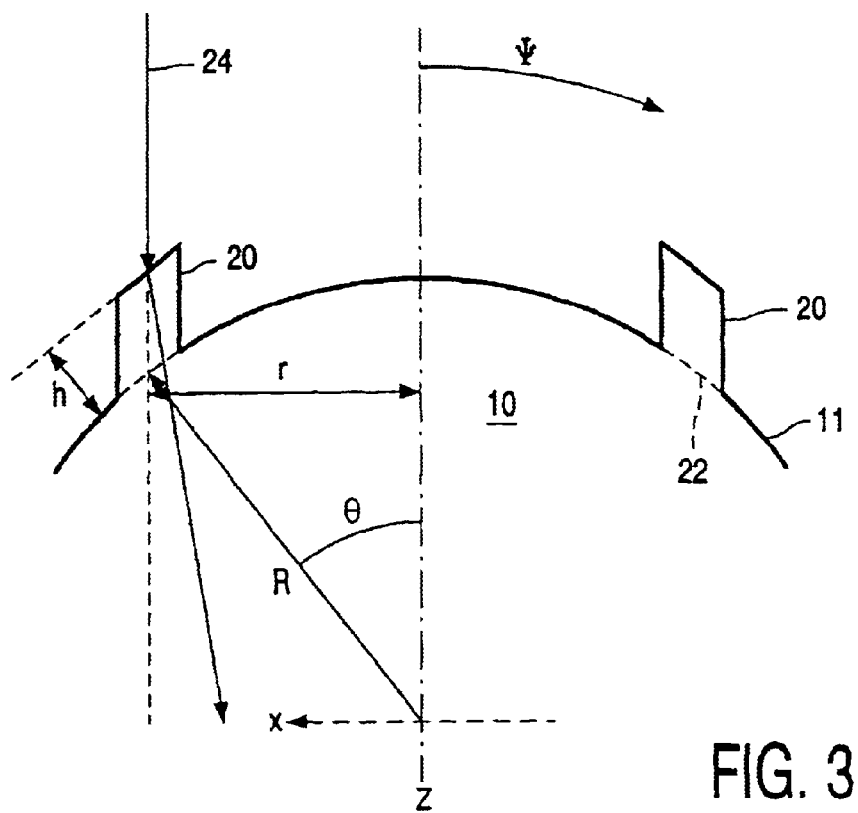
FIG. 3 is a schematic cross section of the objective lens shown in FIG. 2.

FIG. 3 is a cross-section along a plane including an axis, running in the radial direction of the lens 10, indicated as the X axis, and the optical axis of the lens 10, indicated as the Z axis. FIG. 3 illustrates an exemplary embodiment of the objective lens 10 having a single, exemplary, raised step 20, of height h, forming an annular zone of a non-periodic phase structure 11 on the side of the lens which faces the radiation source. The height h of the structure in the Figure is exaggerated; in general, it is small compared to the physical dimensions of the lens. The non-periodic phase structure 11 is superimposed on a basic aspherical lens shape 22 which the lens surface generally follows. The basic lens shape 22 has a best fit radius R. The step 20, as is the case with all steps of a non-periodic phase structure in accordance with this embodiment, has a surface which runs substantially parallel to the basic aspherical lens shape, so as to generally provide the same refractive effect as that provided by the basic lens shape, other than the additional comatic aberration correction effect. An incoming beam of radiation is indicated by means of ray 24 falling on step 22 corresponding to a position at a radius r of the lens surface. A variation in the angle of incidence of the incoming beam of radiation is indicated as an angle of rotation ψ about the Y axis.

Figure 4:
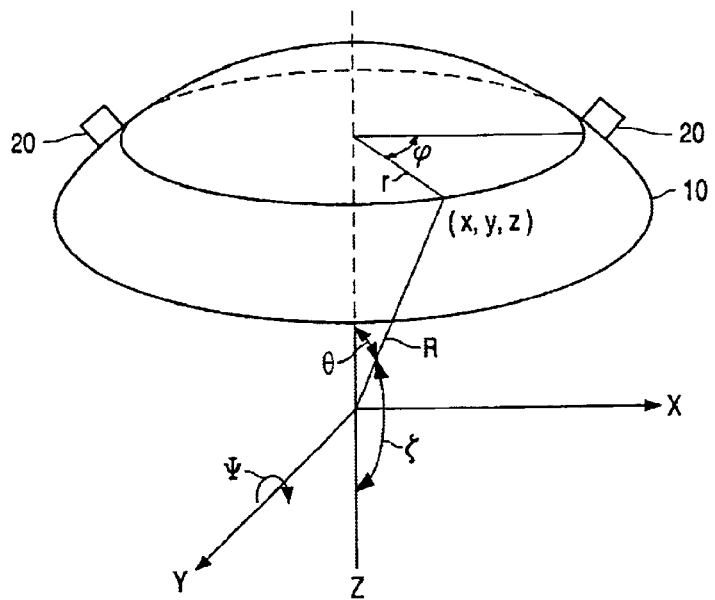
FIG. 4 is a schematic illustration of a spherical coordinate system used in accompanying explanations.

FIG. 4 illustrates the three dimensional coordinate system used to describe a point (x,y,z) on a step 20 of the structure. In addition to the parameters described above, the azimuthal angle Φ about the Z axis, taken with respect to the X axis, is also illustrated.

The stepped profile gives rise to an additional optical path difference OPD equal to $$OPD(\theta) = h\left[-\cos\theta + n\sqrt{1 - \frac{\sin^2\theta}{n^2}}\right] \quad (1)$$

Where h is the height of the structure in radial direction, n the refractive index and θ the angle between the normal on the surface of the step and the Z axis. When we choose the height of the step such that it introduces a phase equal to a multiple of 2π, the structure has no optical effect on the incoming beam.

Consider now the case where the lens rotates an angle ψ around the Y axis (see FIG. 4), where the origin of the co-ordinate system coincides with the centre of curvature of the best fit radius of the aspherical surface of the lens. Let (x,y,z) be a point on the stepped structure. This point can be expressed in spherical co-ordinates as $$(x,y,z)=(R\sin\zeta\cos\Phi, R\sin\zeta, \sin\Phi, R\cos\zeta), \quad (2)$$

where ζ and θ are related according to $$\theta=\pi-\zeta. \quad (3)$$

After rotation this point (x,y,z) is positioned at (x',y',z') given by $$x'=R\sin\zeta\cos\Phi\cos\psi-R\cos\zeta\sin\psi$$

$$y'R\sin\zeta\sin\Phi \quad (4)$$

$$z'=R\sin\zeta\cos\Phi\sin\psi+R\cos\zeta\cos\Psi$$

When we write $$(x',y',z')=(R\sin\zeta'\cos\Phi', R\sin\zeta'\sin\Phi',R\cos\zeta'). \quad (5)$$

we find in lowest order in ψ that $$z'=R\sin\zeta\cos\Phi\sin\psi+R\cos\zeta\cos\psi$$

$$=\psi R\sin\zeta\cos\Phi+R\cos\zeta \quad (6)$$

$$=R\cos(\zeta-\psi\cos\Phi)$$

Hence, we find that $$\zeta'=\zeta-\psi\cos\Phi \quad (7)$$

and thus $$\theta' = \theta + \psi\cos\Phi \quad (8)$$

Substituting this in (1) we find that this small rotation gives rise to a change in OPD in lowest order in $\psi$ equal to $$\Delta OPD(\psi) = OPD(\theta + \psi\cos\varphi) - OPD(\theta) \quad (9)$$

$$\approx h\psi\cos\varphi\sin\theta \left[1 - \frac{\cos\theta}{n\sqrt{1 - \frac{\sin^2\theta}{n^2}}}\right]$$

$$\approx h\psi\cos\varphi\sin\theta \left[\frac{-\cos\theta + n\sqrt{1 - \frac{\sin^2\theta}{n^2}}}{n\sqrt{1 - \frac{\sin^2\theta}{n^2}}}\right]$$

Let the height h be given by $$h = m_j \frac{\lambda}{-\cos\theta + n\sqrt{1 - \frac{\sin^2\theta}{n^2}}} \quad (10)$$

with $m_j$ an integer. This height introduces a phase $m_j 2\pi$ when $\psi=0$. When $\psi$ is nonzero this structure gives rise to a relative phase $\Phi_{rel}$ (hence phase modulo $2\pi$) equal to $$\Phi_{rel} = \frac{2\pi}{\lambda}\Delta OPD(\psi) \approx 2\pi m_j \frac{\psi\sin\theta\cos\varphi}{n\sqrt{1 - \frac{\sin^2\theta}{n^2}}} \approx 2\pi m_j \frac{\psi\sin\theta\cos\varphi}{n} \quad (11)$$

Furthermore, using $\sin\theta = r/R$ (see FIG. 4), we find finally $$\Phi_{rel} = 2\pi m_j \frac{r\psi\cos\varphi}{nR} \quad (12)$$

Notice that this phase is a function of $\cos\Phi$. Hence, it generates a comatic aberration.

Divide the entrance pupil in a number of radial zones. The central radius of each zone is $r_j$. In each zone we introduce a step with a height such that it introduces a phase equal to $m_j 2\pi$ when $\psi=0$. Hence these steps have no, or virtually no, influence on the properties of the lens when the lens is not titled with respect to the axis of the radiation beam. When the lens tilts by an angle $\psi$, each zone j gives rise to a relative phase $\Phi_j$ equal to $$\Phi_j = 2\pi m_j \frac{r_j \psi\cos\varphi}{nR} \quad (13)$$

By proper choice of the zones and the integer values $m_j$ we can compensate to a good extent the coma arising from the tilted lens by these phase structures, while in the non tilted case these structures have no effect on the wavefront. In the following an explicit embodiment of the above principle will be given.

In this embodiment, the objective lens 10 focuses an incoming parallel beam with wavelength $\lambda=660$ nm into a converging beam with NA=0.6, which forms through a disc cover layer of 0.6 mm a spot on the information layer. The free working distance in this embodiment is 1.353 mm. The cover layer thickness of the disk is 0.6 mm made of polycarbonate with a refractive index n=1.5796. The lens has thickness on the optical axis of 1.817 mm and entrance pupil diameter of 3.3 mm. The body of the lens is made of LAFN28 Schott glass with refractive index n=1.7682. The convex surface of the lens body which is directed towards the collimator lens has radius 2.28 mm. The aspherical shape is realised by means of a thin layer of acryl on top of the glass body. The lacquer has refractive index n=1.5640. The thickness of this layer on the optical axis is 17 micrometer. The rotational symmetric aspherical shape is given by the equation:

$$z(r) = B_{2i} r^{2i} \quad (14)$$

with z being the position of the surface in the direction of the optical axis in millimetres, r the distance to the optical axis in millimetres, and $B_k$ the coefficient of the $k^{th}$ power of r. The value of the coefficients $B_2$ to $B_{10}$ are in this example 0.2420141, −0.0045950331, −0.00016786429, −4.2268162 $10^{-5}$, and 8.5889657 $10^{-6}$, respectively.

As a function of the field angle $\psi$ the lens, when uncorrected, gives rise to a comatic wavefront aberration W which is given by:

$$W(\rho,\psi) = [A_{31}(3\rho^3 - 2\rho)\cos(\Phi) + A_{51}(10\rho^5 - 12\rho^3 + 3\rho)\cos(\psi)]\psi$$

with $\rho$ being the normalized pupil coordinate and the Aernike coefficients being given by $A_{31}=6.457\lambda$ and $A_{51}=5.429\lambda$ (with $\lambda$ the wavelength). The angle $\psi$ is expressed in radians. This results in a root mean square of the optical path difference of the wavefront aberration, also referred to as the root mean square of the wavefront error, $OPD_{rms}=0.0485\lambda$.

The best fit radius of the aspheric surface is R=2.268 mm. Let $r_{max}$ be the pupil radius, $r_{max}=1.65$ mm. We define:

$$\bar{\rho}_j = r_j / r_{max} \quad (16)$$

An annular zone present on the curved (aspheric) surface of the lens centred at $r_j$ introduces a comatic wavefront contribution $W_j$ equal to (using equation (13)):

$$W_j/\lambda = \Phi_j/2\pi = 0.465 m_j \bar{\rho}_j \cos(\theta)\psi \quad (17)$$

To compensate the comatic wavefront aberration introduced by the lens we provide a non-periodic structure divided into a selected number of zones, preferably less than say 10 for manufacturing efficiency. First the case where the non-periodic phase structure consists of three zones, with only the middle zone giving rise to a nonzero phase, is considered. For ease of notation we write the coma introduced by the lens as $$W(\rho,\psi) = \psi f(\rho)\cos\theta \quad (18)$$

And for the coma introduced by the one step non-periodic phase structure $$W(\rho,\psi) = \psi Q\cos\varphi \quad \rho_1 \leq \rho \leq \rho_2 \quad (19)$$
$$= 0 \quad \text{elsewhere}$$

Note that in the example we have $$f(\rho) = A_3(3\rho^3 - 2\rho) + A_{51}(10\rho^5 - 12\rho^3 + 3\rho) \quad (20)$$

$$Q = 0.465 \, m \, \bar{\rho}\lambda \quad (21)$$

The root mean square of the optical path difference ($OPD_{rms}$) of the sum of these two terms is given by $$OPD_{rms}(\rho_1, \rho_1, Q) = \qquad (22)$$

$$|\psi|\sqrt{\int_0^1 f(\rho)^2 \rho d\rho + 2Q\int_{\rho_1}^{\rho_2} f(\rho)\rho d\rho + \frac{1}{2}Q^2(\rho_2^2 - \rho_1^2)}$$

Minimizing this expression with respect to Q results $$Q_{min} = \frac{-2\int_{\rho_1}^{\rho_2} f(\rho)\rho d\rho}{\rho_2^2 - \rho_1^2} \qquad (23)$$

In the case of our example (see (20)) we find $$Q_{min} = \left(\frac{4}{3}A_{31} - 2A_{51}\right)\frac{\rho_2^3 - \rho_1^3}{\rho_2^2 - \rho_1^2} - \qquad (24)$$

$$\left(\frac{6}{5}A_{31} - \frac{24}{5}A_{51}\right)\frac{\rho_2^5 - \rho_1^5}{\rho_2^2 - \rho_1^2} - \frac{20}{7}A_{51}\frac{\rho_2^7 - \rho_1^7}{\rho_2^2 - \rho_1^2}$$

Substituting (23) in (22) yields $$OPD_{rms}(\rho_1, \rho_1, Q_{min}) = |\psi|\sqrt{\int_0^1 f(\rho)^2 \rho d\rho - \frac{2(\int_{\rho_1}^{\rho_2} f(\rho)\rho d\rho)^2}{(\rho_1^2 - \rho_1^2)}} \qquad (25)$$

To find the values $\rho_1$ and $\rho_2$ minimizing the $OPD_{rms}$ we have to solve the equations $$\frac{\partial OPD_{rms}}{\partial \rho_1} = 0 \qquad (26)$$

$$\frac{\partial OPD_{rms}}{\partial \rho_2} = 0$$

Applying this to our explicit example we obtain $\rho_1=0.45$, $\rho_2=0.84$, $Q_{min}=3.339\lambda$. From (17) we find then $\bar{\rho}=0.645$, m=11 and the height of the ring is h=11.925 $\mu$m. The comatic wavefront error reduces form $OPD_{rms}=0.0485\lambda$ to $OPD_{rms}=0.0387\lambda$.

In order to obtain a further, more preferred, reduction of the comatic wavefront error an non-periodic phase structure preferably with more than one nonzero phase step has to be applied. The structure preferably has at least four zones with more than one nonzero phase zone. Here we consider an example consisting of 5 zones with 3 nonzero phase zones. Table 1 lists the properties of the resulting non-periodic structure with the heights of the steps in the five different annular zones selected in order to have substantially no effect on the properties of the lens when radiation is incident along the optical axis, but providing a substantially optimum compensation for comatic aberrations generated in the lens. A substantially optimum compensation may be achieved by substantially minimising the residual rms wavefront error within the constraint of the finite, relatively small, number of zones provided.

Figure 5:
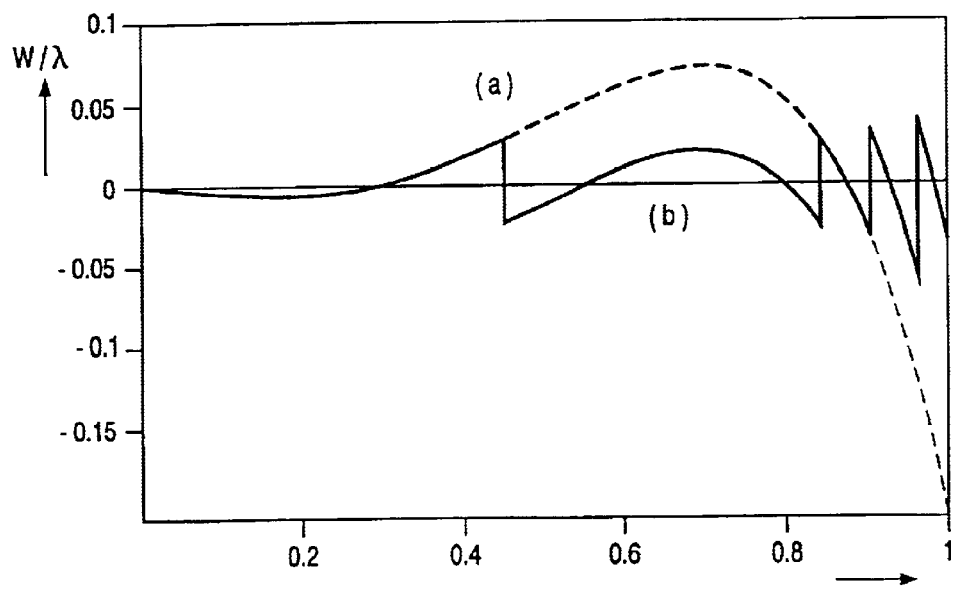
FIG. 5 is a graph showing compensated, and uncompensated, wavefront aberrations.

FIG. 5 illustrates the wavefront aberration W/$\lambda$ for $\Phi=0$ and $\psi=0.0175$ radians (an exemplary maximum required field angle) a function of the normalized pupil coordinate $\rho$. Dashed line (a) represents the uncompensated wavefront aberration, whereas solid line (b) illustrates the compensated wavefront aberration.

As a result of the presence of the non-periodic phase structure the comatic wavefront aberration reduces from $OPD_{rms}=0.0485\lambda$ to $OPD_{rms}=0.0124\lambda$, hence a reduction of a factor of 4.

TABLE 1

| j | $\rho_{begin}$ | $\rho_{end}$ | $\bar{\rho}_j$ | $m_j$ | $\sin\theta_j = \bar{\rho}_j r_{max}/R$ | $\Phi_j/2\pi$ | $h_j$ [$\mu$m] |
|---|---|---|---|---|---|---|---|
| 1 | 0 | 0.45 | 0.225 | 0 | 0.164 | 0.000 | 0.0 |
| 2 | 0.45 | 0.84 | 0.645 | 10 | 0.469 | 0.052 | 10.841 |
| 3 | 0.84 | 0.9 | 0.870 | 0 | 0.633 | 0 | 0 |
| 4 | 0.9 | 0.96 | 0.930 | −9 | 0.677 | −0.068 | −8.814 |
| 5 | 0.96 | 1.0 | 0.980 | −21 | 0.713 | −0.167 | −20.062 |

In the above embodiment the step height $h_j$ has been given as a constant value. This is useful as a first approximation, with the step height being calculated appropriately for the radial centre of the zone. However, a slightly better result can be achieved by taking into account the variation in angle $\theta$ across the width of a zone, such that the step height varies slightly across the zone.

It is to be appreciated that numerous variations and modifications may be employed in relation to the embodiments described above, without departing from the scope of the invention which is defined in the appended claims. The objective lens is shown as a convex-convex lens; however other lens element types such as plano-convex or convex-concave lenses may also be used. Whilst the objective lens as in the described embodiment is a single lens, it may be a compound lens containing two or more lens elements, either, or both, of which may include at least a part of the non-periodic phase structure of the invention. The non-periodic phase structure may be divided between different parts of the optical system. The objective lens may for example comprise a refractive objective lens element and a diffractive lens element. The non-periodic phase structure may also be provided on an optical element separate from the objective lens, for example on a separate generally aspherical thin plate. The application of the non-periodic phase structure according to the invention is not limited to the field of optical recording. The phase structure may be used in any field of optics, e.g. photography and the field of telescopes. Although the embodiments of the non-periodic phase structure shown hereinbefore are arranged on a curved surface, the phase structure may be arranged on a surface having any shape, e.g. a flat surface. It should be noted, that for a proper operation of the phase structure the wavefront of the incident beam at the surface on which the non-periodic phase structure is arranged must a shape different from that of the surface. More specifically, if the wavefront is substantially spherical and the surface is also substantially spherical, the radii of curvature of the wavefront and the surface have to be different, preferably different by more than 20%. For example, when the phase structure is arranged on a flat surface, the incident beam must have a vergency unequal to zero.

Whilst in the above described embodiment a scanning device for scanning carriers of DVD format is described, it is to be appreciated that the scanning device can be alternatively or additionally used for any other types of optical record carriers to be scanned. It is also to be appreciated that radiation of other combinations of wavelengths than 660 nm, suitable for scanning optical record carriers, may be used.

What is claimed is:

1. An optical scanning device for scanning optical record carriers with radiation of a selected wavelength, the device including an objective lens, having an axial direction and a radial direction, the objective lens having a phase structure which is non-periodic with respect to the radial direction, the non-periodic phase structure being arranged to compensate for comatic aberrations generated in the objective lens when an optical record carrier is read in a direction which is non-axial with respect to said objective lens, wherein said non-periodic phase structure compensates at least 50% of the root mean square (rms) comatic wavefront error at a certain field angle with respect to the axial direction and caused by the objective.

2. The optical scanning device of claim 1, wherein said non-periodic phase structure compensates at least 70% of the root mean square (rms) comatic wavefront error at said certain field angle.

3. An optical scanning device for scanning optical record carriers with radiation of a selected wavelength the device including an objective lens, having an axial direction and a radial direction, the objective lens having a phase structure which is non-periodic with respect to the radial direction, the non-periodic phase structure being arranged to compensate for comatic aberrations generated in the objective lens when an optical record carrier is read in a direction which is non-axial with respect to said objective lens, wherein the rms wavefront error caused by the comatic aberration generated by the objective lens at a maximum required field angle with respect to the axial direction, as compensated by the non-periodic phase structure, less than 40 ml.

4. The optical scanning device of claim 3, wherein the rms wavefront error is less than 20 m$\lambda$.

5. An optical scanning device for scanning optical record carriers with radiation of a selected wavelength, the device including an objective lens, having an axial direction and a radial direction, the objective lens having a phase structure which is non-periodic with respect to the radial direction, the non-periodic phase structure being arranged to compensate for comatic aberrations generated in the objective lens when an optical record carrier is read in a direction which is non-axial with respect to said objective lens, wherein said non-periodic phase structure includes a plurality of annular zones, each of said zones comprising a step of a substantially constant height with respect to a rotationally symmetrical aspheric shape generally followed by said objective lens, said step having a surface located at the substantially constant height such that all points on said step surface are located at about a constant distance from said aspheric shape.

6. The optical scanning device of claim 5, wherein said steps generate a relative phase difference of approximately a multiple of $2\pi$ for radiation of said selected wavelength when an optical record carrier is read in said axial direction.

7. The optical scanning device of claim 5, wherein the radial widths of said zones are selected in dependence on the comatic aberration to be compensated for.

8. The optical scanning device of claim 7, wherein said zones comprise a zone (a) with a nonzero height, measured in relation to said aspheric shape, located in the region in which the nonitalized pupil coordinate $\rho$ ranges from 0.45 to 0.84.

9. The optical scanning device of claim 8, wherein said zone (a) ends prior to a normalized pupil coordinate $\rho$ of 0.85.

10. The optical scanning device of claim 7, wherein said zones comprise a zone (b) with a nonzero height, measured in relation to said aspheric shape, located in the region in which the normalized pupil coordinate r ranges from 0.9 to 1.00.

11. The optical scanning device of claim 10, wherein said zones comprise a plurality of zones with a nonzero height, measured in relation to said aspheric shape, located in the region in which the normalized pupil coordinate $\rho$ ranges from 0.9 to 1.00.

12. The optical scanning device of claim 5, wherein the heights of said zones are selected substantially optimally in relation to the comatic aberrations to be compensated for.

13. The optical scanning device of claim 6, wherein the number of said zones is greater than four.

14. The optical scanning device of claim 7, wherein the number of said zones is less than ten.

15. The optical scanning device of claim 8, wherein maid non-periodic phase structure is formed on the surface of said objective lens.

16. An optical system including an optical element having optical power and an axial direction and a radial direction, the optical element having a phase structure which is non-periodic with respect to the radial direction, the non-periodic phase structure being arranged to compensate for comatic aberrations generated by the optical element when an optical beam traverses the optical system in a direction which is non-axial with respect to said element, the non-periodic phase structure having a first step, the first step having a surface located opposite to a surface shape followed by the optical element such that all points on the surface of the first step are located at about a constant distance from said surface shape.

17. The optical system of claim 16, wherein the surface of the first step is oriented substantially parallel to said surface portion.

18. The optical system device of claim 16, wherein the non-periodic phase structure comprises a plurality of steps that includes the first step, and wherein said steps generate a relative phase difference of approximately a multiple of $2\pi$ when said optical beam is directed in said axial direction.

19. The optical system device of claim 16, wherein said non-periodic phase structure compensates at least 50% of the root mean square (rms) comatic wavefront error at a certain field angle with respect to the axial direction and caused by the optical element.

20. The optical system device of claim 16, wherein the rms wavefront error caused by the comatic aberration generated by the optical element at a maximum required field angle with respect to the axial direction, as compensated by the non-periodic phase structure, is less than 40 ml.

21. The optical system of claim 16, wherein said surface shape comprises an aspheric shape.

22. The optical system scanning device of claim 5, wherein the step surface is oriented substantially parallel to said aspheric shape.

* * * * *